(12) United States Patent
Liang (10) Patent No.: US 8,441,211 B2
(45) Date of Patent: May 14, 2013

(54) ELECTRONIC BALLAST CAPABLE OF SELF-PROTECTION AT NATURAL OR PREMATURE END OF LIFE OF FLUORESCENT LIGHT TUBE

(75) Inventor: Jim-Hung Liang, Taipei (TW)

(73) Assignee: Skynet Electronic Co., Ltd., Taipei (TW)

( * ) Notice: Subject to any disclaimer, the term of this patent is extended or adjusted under 35 U.S.C. 154(b) by 99 days.

(21) Appl. No.: 13/239,596

(22) Filed: Sep. 22, 2011

(65) Prior Publication Data

US 2013/0038214 A1 Feb. 14, 2013

(30) Foreign Application Priority Data

Aug. 8, 2011 (TW) .............................. 100128136 A (51) Int. Cl.
*G05F 1/00* (2006.01)
(52) U.S. Cl.
USPC ............. 315/309; 315/291; 315/247; 315/94; 315/46
(58) Field of Classification Search .................. 315/247, 315/246, 209 R, 224, 225, 274–279, 291, 315/297, 307–311, 46, 94
See application file for complete search history.

(56) References Cited

U.S. PATENT DOCUMENTS

2003/0006720 A1* 1/2003 Borella et al. ................ 315/291
2006/0038513 A1* 2/2006 Henry .......................... 315/291

\* cited by examiner

*Primary Examiner* — Tuyet Thi Vo
(74) *Attorney, Agent, or Firm* — Bacon & Thomas, PLLC (57) ABSTRACT

The present invention is to provide an electronic ballast connected in parallel to two filaments of a fluorescent light tube, which comprises a controller for generating two output signals, two power switches being switched according to the output signals, a resonant circuit oscillating according to switching of the power switches and thereby causing a resonant capacitor thereof to generate a voltage, a voltage sensor connected in series to the resonant capacitor and connected in parallel between the two filaments so as to sense an AC voltage proportional to a voltage across the fluorescent light tube, and a regulator connected separately to the voltage sensor and controller so as to convert the AC voltage into a DC voltage and deliver the DC voltage to the controller. Upon determining that the DC voltage exceeds a preset voltage level, the controller generates an interruption control signal for immediately stopping operation of the controller.

5 Claims, 6 Drawing Sheets

ELECTRONIC BALLAST CAPABLE OF SELF-PROTECTION AT NATURAL OR PREMATURE END OF LIFE OF FLUORESCENT LIGHT TUBE

FIELD OF THE INVENTION

The present invention relates to an electronic ballast, more particularly to an electronic ballast capable of self-protection at a natural or premature end of life of a fluorescent light tube, so as to eradicate the possibility of spark or electric arc generation at filaments of the fluorescent light tube and to protect components and circuits of the electronic ballast from being burned. Thus, when the fluorescent light tube comes to its natural end of life or a premature end of life, the electronic ballast can be recycled in its entirety and then reused with a new fluorescent light tube after a simple replacement process, thereby achieving sustainable use of resources as well as environmental protection.

BACKGROUND OF THE INVENTION

Nowadays, for cost-saving purposes, fluorescent lamp manufacturers use electronic ballasts of substantially the same circuit design. These electronic ballasts have been widely used in lamps configured for fluorescent light tubes and energy-saving light bulbs.

Figure 1:
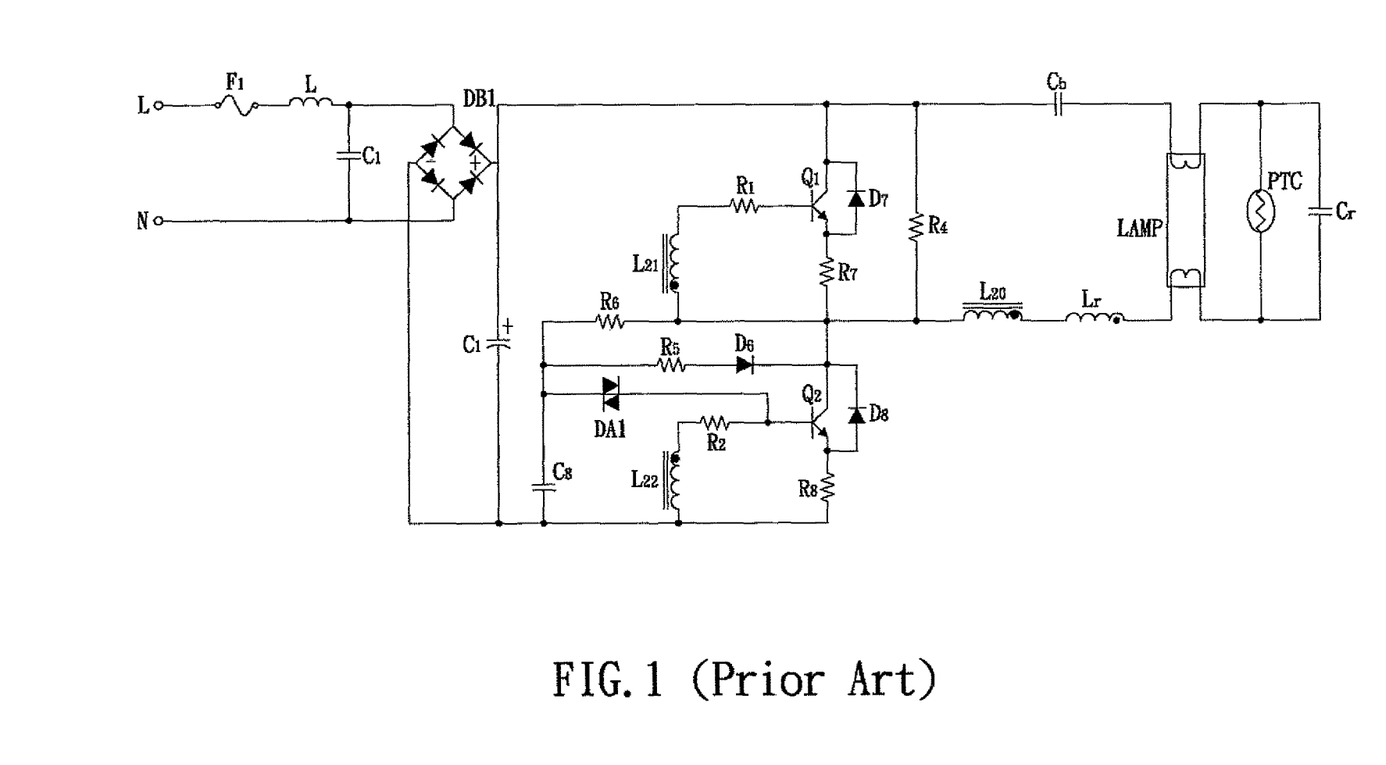
FIG. 1 is the circuit diagram of an electronic ballast for use with GE's 21W Edison energy-saving light bulb.
Figure 2:
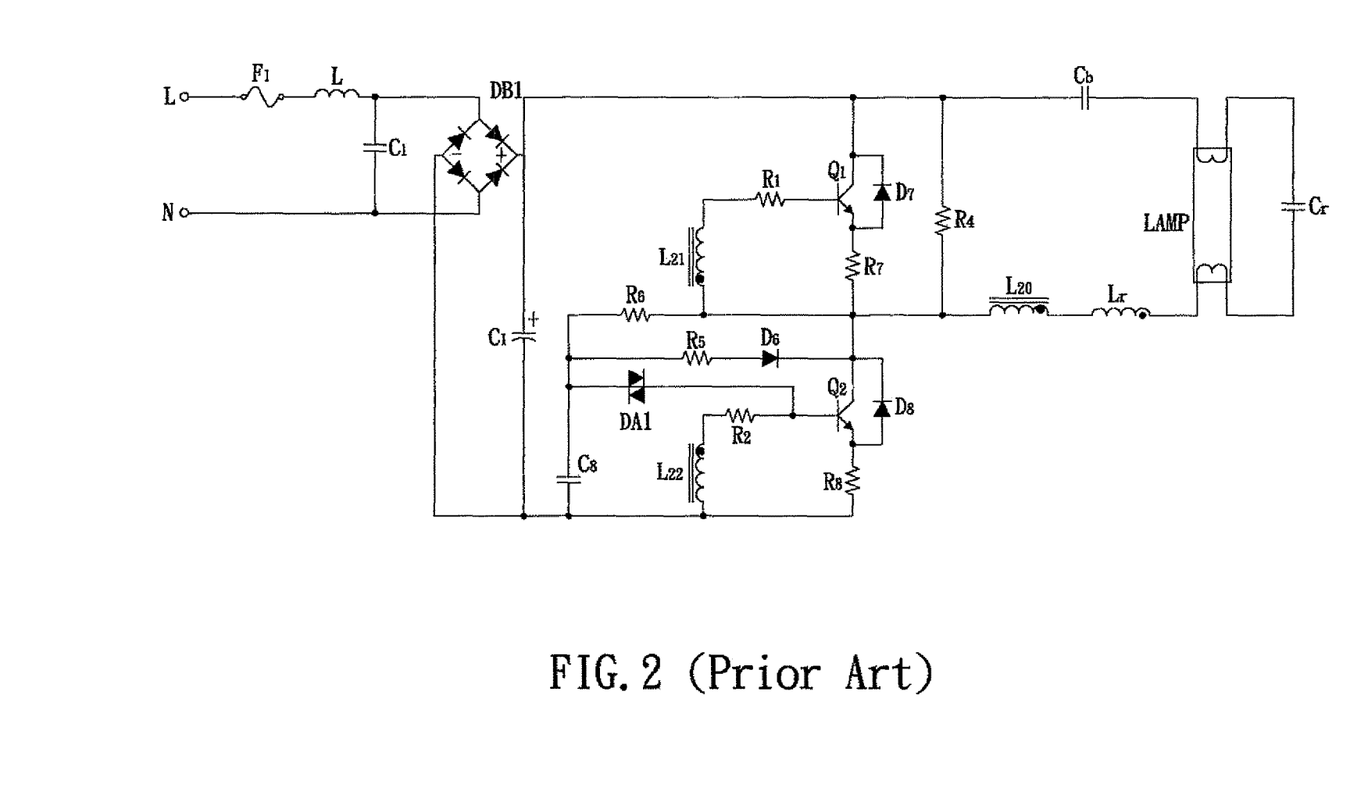
FIG. 2 is the circuit diagram of an electronic ballast for use with PHILIPS' 23W HELIX energy-saving light bulb.
Figure 3:
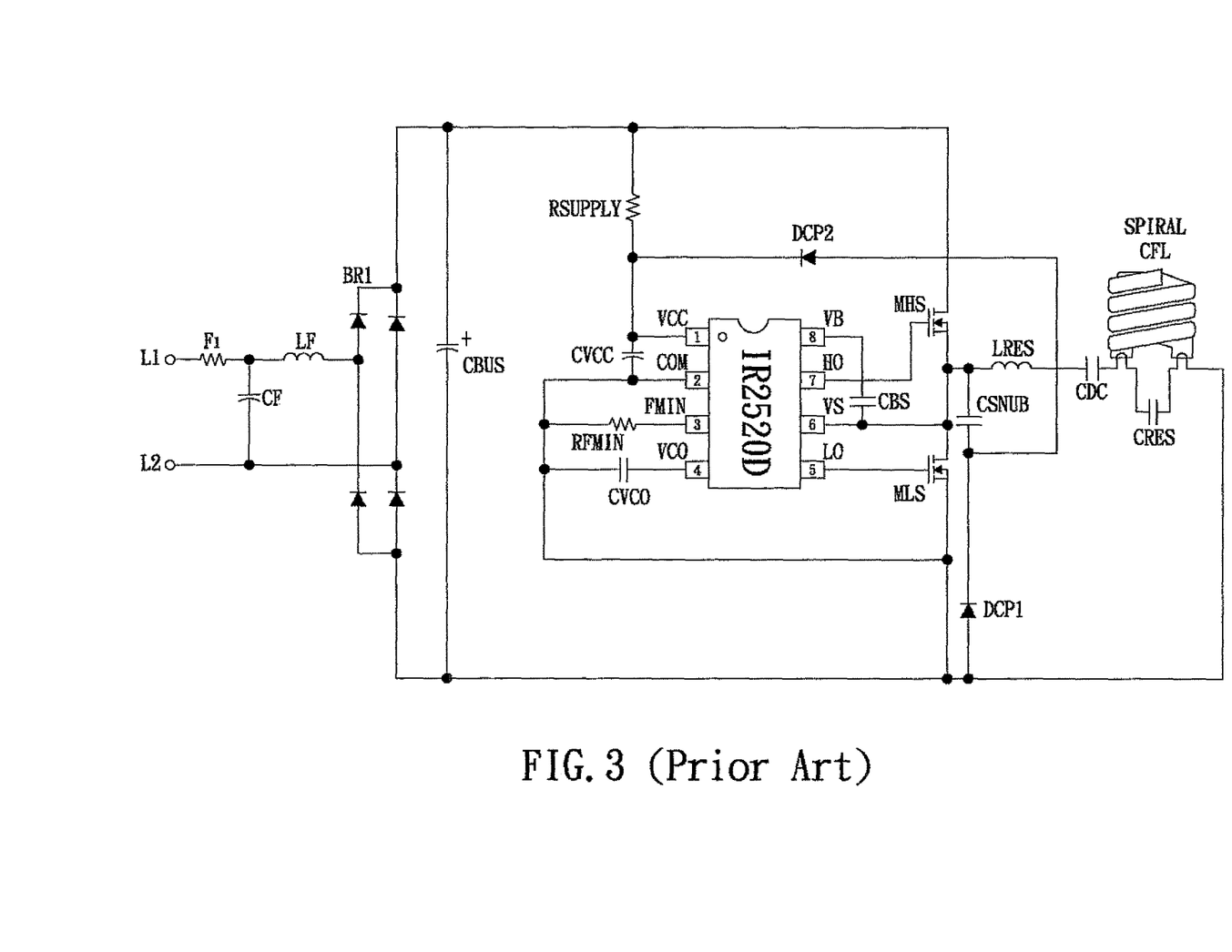
FIG. 3 is the circuit diagram of an electronic ballast designed for an energy-saving light bulb and using an IC developed by International Rectifier.

The basic power transmission structure of an electronic ballast typically consists of a half-bridge resonant circuit, either self-excited or separately excited in terms of control. FIGS. 1 and 2 show two self-excited oscillating circuits of commercially available energy-saving lamps, namely the 21W Edison energy-saving lamp made by GE of USA and the 23W HELIX energy-saving lamp by PHILIPS of the Netherlands. FIG. 3, on the other hand, shows a separately excited oscillating circuit designed by International Rectifier (IR) of USA for promoting its control IC IR2520D in energy-saving lamp applications (see IR's Application Note AN1066).

The working principles of the aforementioned electronic ballast circuits and their drawbacks are explained and analyzed as follows. Basically, the power transmission structure of all these electronic ballast circuits is a half-bridge inductor-capacitor (LC) resonant circuit including a pair of series-connected power switches (wherein $Q_1$ is referred to as the upper-arm switch, and $Q_2$ as the lower-arm switch), a direct-current (DC) blocking capacitor $C_b$, a resonant inductor $L_r$, a resonant capacitor $C_r$, and a control circuit for the power switches. The electronic ballast circuits in FIGS. 1 and 2 are self-excited circuits, which, generally speaking, must include a starter circuit. The starter circuit in FIGS. 1 and 2 is composed of $R_4$, $R_6$, $C_8$, and DA1 (which is a diode for alternating current, or diac). The principle by which the self-excited circuits in FIGS. 1 and 2 can keep oscillating lies in a driving transformer which is made of an easily saturated magnetic core and configured for driving the power switches $Q_1$, $Q_2$ separately. The driving transformer includes three windings $L_{20}$, $L_{21}$, $L_{22}$, wherein the primary winding $L_{20}$ is series-connected in a resonant circuit, and the two secondary windings $L_{21}$, $L_{22}$ are connected, in opposite polarities, to the input ends of the power switches $Q_1$, $Q_2$ respectively. Once the lower-arm switch $Q_2$ is turned on, the magnetic flux of the driving transformer varies between a positive saturation level and a negative saturation level, thereby turning on the power switches $Q_1$, $Q_2$ alternately. As a result, the resonant circuit, which consists of the resonant inductor $L_r$ and the resonant capacitor $C_r$, begins to oscillate. Before the fluorescent light tube LAMP is lit, the light tube forms a substantially open circuit; therefore, the voltage at the resonant capacitor $C_r$ keeps increasing until the argon gas in the fluorescent light tube LAMP is ionized, which in turn causes gasification and hence ionization of the mercury in the light tube. As the mercury ionization process generates ultraviolet light, the phosphor powder on the tube wall is excited by the ultraviolet light to emit visible light; thus, the fluorescent light tube LAMP is lit. At the same time, the gasified and ionized mercury causes a decrease in the voltage across the fluorescent light tube LAMP. Because of that, the light tube, when operating at a high frequency, functions as a resistor, and the circuit is turned into an oscillating inductor-resistor (LR) circuit, in which current intensity is determined by the saturation current of the driving transformer, and oscillation frequency is determined mainly by the resonant inductor $L_r$ and the light tube resistor. As such, the fluorescent lamp remains lit.

The circuits in FIGS. 1 and 2 are different in that the light tube in FIG. 1 is connected in parallel to a resistor having a positive temperature coefficient, which resistor is generally known as PTC and has a resistance of several ohms under normal temperature. Immediately after the lamp is turned on, the filaments of the fluorescent light tube LAMP are preheated by the current flowing through the resistor PTC. Once the resistor PTC itself is heated by the current, the resistance of the resistor PTC rockets to the megohm level. As a result, the fluorescent light tube is lit by a high voltage generated by oscillation of the resonant capacitor $C_r$, while the preheated filaments emit hot electrons to ward off impact of the argon ions and thereby extend the service life of the filaments. However, should a mismatched resistor PTC be used, the argon gas may not be successfully ionized at the first time. As the argon gas is ionized repeatedly, the filaments are subject to repeated impact of the argon ions and may therefore end up having a shortened service life. This is probably the reason why the circuit in FIG. 2 dispenses with the resistor PTC having a positive temperature coefficient, and experiment results have justified such an omission.

The circuit shown in FIG. 3 is an oscillating circuit designed by International Rectifier to promote its control IC IR2520D in energy-saving lamp applications. In this separately excited circuit, the half-bridge power switches are both Power MOS, in which the upper-arm switch is indicated by MHS, and the lower-arm switch by MLS. In addition, LRES denotes a resonant inductor, CDC denotes a balancing capacitor, CRES denotes a resonant capacitor, and IR2520D denotes an upper-lower-arm half-bridge control circuit. The upper-lower-arm half-bridge control circuit sends out a signal whose frequency is, to begin with, higher than the resonant frequencies of the resonant inductor LRES and the resonant capacitor CRES and then gradually lowers. When the driving frequency is relatively high, resonant oscillation does not occur in the resonant inductor LRES or the resonant capacitor CRES; therefore, a current flows through the resonant capacitor CRES and the filaments to preheat the filaments. When the driving frequency falls to the vicinity of the resonant frequencies of the resonant inductor LRES and the resonant capacitor CRES, the resonant capacitor CRES begins resonant oscillation and thereby produces a high voltage to ionize the argon gas. After ignition, the driving frequency is fixed at a preset frequency to keep the light tube lit. The foregoing is the main operating principle of the circuit in FIG. 3.

Nevertheless, none of the three electronic ballasts described above has a preset self-protection mechanism to cope with the aging of a fluorescent light tube. As a fluorescent light tube ages, the voltage across the light tube tends to rise continuously, and the voltage may become so high that the related components and circuits will be burned. Moreover, with the light tube filaments in each of the electronic ballast circuits being connected in series between the resonant inductor and the resonant capacitor, energy on two sides of the resonant inductor and the resonant capacitor may begin a tug of war should any of the filaments suddenly break, either because of age of defects, thus causing sparks at and consequently an electric arc between the disconnected ends of the broken filament. If the control circuit continues in operation, the high heat generated by the electric arc may burn up the broken filament, or even burn the post supporting that filament. In the latter scenario, the high temperature at the lamp head corresponding to the post may ignite the plastic components outside the lamp head and give rise to a fire accident. It should be noted that the electric arc will persist until the electronic ballast circuit is completely burned. Although the chances of creating an electric arc are only a few percent, the electric arc, once formed, is extremely dangerous and has serious consequences. Currently, a typical solution is to use relatively weak power switches so that the electronic ballast will burn prior to the light tube when the light tube becomes aged. While this expedient approach is very likely to pass the end-of-life tests of light tubes, the risks of fire accidents attributable to electronic ballasts remain if the power switches fail to burn before the light tubes as expected.

According to the above, the conventional electronic ballasts do not have a self-protection mechanism; therefore, when a light tube using such an electronic ballast reaches its natural end of life or a premature end of life, the electronic ballast will, by design, end its own life by burning its own circuit. As repair is cost-inefficient, there seems to be no better way to deal with a damaged energy-saving light bulb or electronic ballast than to discard it, which, however, is a waste of resources and causes severe pollution. Recently, with the increasing prevalence of environmental awareness, it has been a crucial issue for governments around the world and for all industries to recycle, repair, and reuse all sorts of articles, and yet the various electronic ballasts and fluorescent light tubes turn out to be a major obstacle, for they almost always end up with burned circuits—be they because of the age or defects of the light tubes—and are therefore totally unrecyclable. Hence, the major problem to be solved by the present invention is to design an electronic ballast which is structurally simple, self-protective, and completely recyclable. It is highly desirable that, when the filaments of a fluorescent light tube using this novel electronic ballast break because of age or defects, the self-protection mechanism of the electronic ballast not only can prevent the occurrence of electric arcs and fire accidents otherwise attributable thereto, but also can stop the operation of the resonant circuit in the electronic ballast immediately so that the resonant circuit is protected from excessive power consumption which may otherwise burn the related circuits and components in the electronic ballast.

BRIEF SUMMARY OF THE INVENTION

The present invention provides an electronic ballast capable of self-protection at a natural or premature end of life of a fluorescent light tube. The electronic ballast includes a controller, two power switches, a DC blocking capacitor, a resonant circuit, a voltage sensor, and a regulator. The controller is connected to the power switches and controls switching of the power switches. The power switches are connected to the resonant circuit via the DC blocking capacitor. The resonant circuit includes a resonant inductor and a resonant capacitor. The resonant inductor is connected in series between the power switches and one filament of the fluorescent light tube. The resonant capacitor is series-connected to the voltage sensor, and the series-connected resonant capacitor and voltage sensor are parallel-connected between the two filaments of the fluorescent light tube. The voltage sensor senses the alternating-current (AC) voltage of the resonant capacitor by detecting the current intensity therein and then delivers the AC voltage to the regulator, wherein the AC voltage is in proportion to the voltage across the fluorescent light tube. The regulator converts the received AC voltage into a DC voltage and delivers the DC voltage to an input end of the controller. The controller includes a comparator which, upon determining that the level of the DC voltage exceeds a tolerable voltage level, generates an interruption control signal to stop the operation of the controller immediately. Thus, the circuits and components of the electronic ballast are effectively prevented from burning which may otherwise result from continuous overload of the filaments at the end of life of the fluorescent light tube. Furthermore, as the filaments are not connected in series in the resonant circuit, the risks of spark or electric arc generation at the filaments are eliminated; consequently, the plastic components at the lamp heads are protected from being burned.

The primary object of the present invention is to eradicate the possibility of spark or electric arc generation at the filaments of a fluorescent light tube and to protect the components and circuits of an electronic ballast from being burned when the fluorescent light tube using the electronic ballast ages or malfunctions because of defects, with a view to preventing fire accidents effectively. Moreover, once the fluorescent light tube comes to its natural end of life or a premature end of life, the electronic ballast can be recycled in its entirety and then reused with a new fluorescent light tube after a simple replacement process, thereby achieving sustainable use of resources as well as environmental protection.

BRIEF DESCRIPTION OF THE SEVERAL VIEWS OF THE DRAWINGS

The structure as well as a preferred mode of use, further objects, and advantages of the present invention will be best understood by referring to the following detailed description of some illustrative embodiments in conjunction with the accompanying drawings, in which.

DETAILED DESCRIPTION OF THE INVENTION

Figure 4:
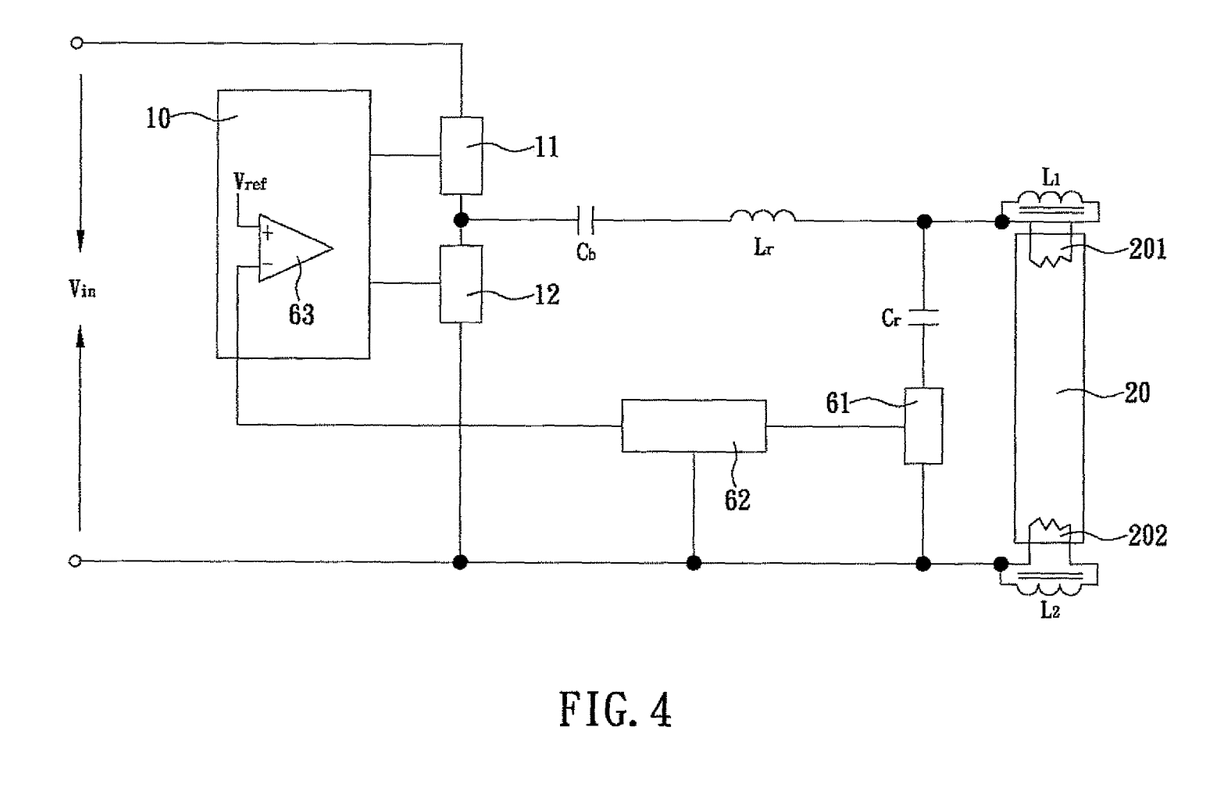
FIG. 4 is the circuit block diagram of an electronic ballast according to a preferred embodiment of the present invention.

The present invention discloses an electronic ballast capable of self-protection at a natural or premature end of life of a fluorescent light tube. Referring to FIG. 4, an electronic ballast in accordance with a preferred embodiment of the present invention is connected to a fluorescent light tube 20 whose two ends are provided with a first filament 201 and a second filament 202 respectively. The ballast circuit includes a controller 10; two power switches 11, 12; a DC blocking capacitor $C_b$; a resonant circuit; a voltage sensor 61; and a regulator 62. The controller 10 is connected to the power switches 11, 12 and controls the switching thereof. The power switches 11, 12 are connected to the resonant circuit by way of the DC blocking capacitor $C_b$. The resonant circuit includes a resonant inductor $L_r$ and a resonant capacitor $C_r$. The resonant inductor $L_r$ is connected in series between the power switches 11, 12 and the first filament 201 of the fluorescent light tube 20. The resonant capacitor $C_r$ is connected in series to the voltage sensor 61, while the series-connected resonant capacitor $C_r$ and voltage sensor 61 are connected in parallel between the two filaments 201, 202 of the fluorescent light tube 20. The voltage sensor 61 is configured for sensing an AC voltage proportional to the voltage across the fluorescent light tube 20 and delivering the AC voltage to the regulator 62. The regulator 62 converts the AC voltage into a DC voltage and delivers the DC voltage to an input end of the controller 10. The controller 10 includes a comparator 63. Upon determining that the level of the DC voltage exceeds a tolerable voltage level $V_{ref}$, the comparator 63 generates an interruption control signal so that the operation of the controller 10 is stopped at once.

Figure 5:
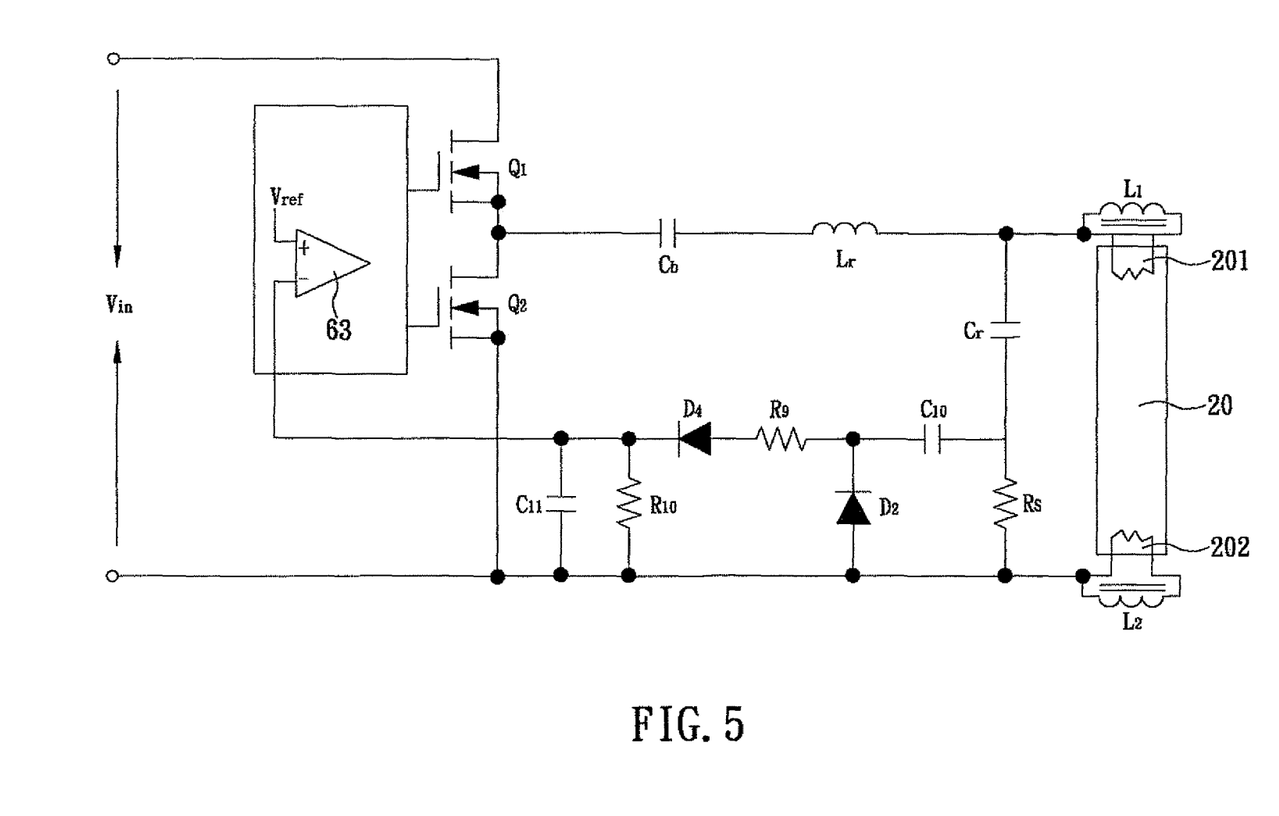
FIG. 5 is a detailed circuit diagram of the electronic ballast depicted in FIG. 4.

The connections between, and the working principles of, the components of the preferred embodiment of the present invention are detailed as follows. Referring to FIGS. 4 and 5, the controller 10 is configured for generating at least two output signals, namely a first output signal and a second output signal. The first and the second output signals are voltage signals of the same frequency, but have different phases. The first power switch 11 is a power metal-oxide-semiconductor field-effect transistor (hereinafter abbreviated as Power MOSFET) $Q_1$. The gate of the first power switch 11 receives the first output signal so that the first power switch 11 is switched according to the first output signal. The drain of the first power switch 11 is connected to the positive electrode of a power supply $V_{in}$. Likewise, the second power switch 12 is a Power MOSFET $Q_2$. The gate of the second power switch 12 receives the second output signal so that the second power switch 12 is switched according to the second output signal. The drain of the second power switch 12 is connected to the source of the first power switch 11, while the source of the second power switch 12 is connected to the negative electrode of the power supply $V_{in}$. Now that the series-connected resonant capacitor $C_r$ and voltage sensor 61 are connected in parallel to the filaments 201, 202 at the two ends of the fluorescent light tube 20, and the series-connected resonant inductor $L_r$ and DC blocking capacitor $C_b$ are connected between the resonant capacitor $C_r$ and a line connecting the first and the second power switches 11, 12, when the controller 10 generates the first and the second output signals sequentially to drive the power switches 11, 12 in an alternate manner, two driving signals whose frequencies are close to the resonant frequencies of the resonant inductor $L_r$ and the resonant capacitor $C_r$ can be generated to drive the power switches 11, 12 by turns. As a result, the resonant capacitor $C_r$ generates a high voltage that ionizes the argon gas in the fluorescent light tube 20 rapidly, and the accelerated argon ions cause gasification and ionization of the mercury in the fluorescent light tube 20. When the mercury ions are reduced to mercury atoms, ultraviolet light is generated. The ultraviolet light strikes the phosphor powder on the inner wall of the fluorescent light tube 20, making the phosphor powder emit visible light. Thus, the fluorescent light tube 20 is successfully lit.

If the electronic ballast needs preheating, a preheating circuit (not shown) can be provided for applying a preheating voltage to a first preheating winding L connected in parallel to the two ends of the first filament 201 and to a second preheating winding $L_2$ connected in parallel to the two ends of the second filament 202, before the fluorescent light tube 20 is lit. If the electronic ballast does not need preheating, the first and the second preheating windings $L_1$, $L_2$ connected respectively across the first and the second filaments 201, 202 can be dispensed with; in that case, the two ends of each of the first and the second filaments 201, 202 can be individually short-circuited. Whether the first filament 201 and the second filament 202 have their ends short-circuited or not, the fact that both filaments 201, 202 are not connected in series in the resonant circuit prevents the generation of sparks or electric arcs at any of the filaments 201, 202 that suddenly breaks, for there will be no energy oscillating between the disconnected ends of the broken filament.

Referring again to FIG. 4, although it is the AC current through the resonant capacitor $C_r$ that the voltage sensor 61 senses, the intensity of this AC current in the resonant capacitor $C_r$ can fully reflect the voltage level across the fluorescent light tube 20. Therefore, in the preferred embodiment of the present invention, the voltage sensor 61 is realized by no more than a sensing resistor $R_s$ connected in series between the resonant capacitor $C_r$ and the second filament 202, as shown in FIG. 5, so as for the voltage sensor 61 to obtain from the resonant capacitor $C_r$ an AC voltage proportional to the voltage across the light tube. As mentioned previously, the voltage across the fluorescent light tube 20 may increase gradually or abruptly when the light tube ages or malfunctions due to defects. And this is why the comparator 63 in the half-bridge controller 10 has to determine if the DC voltage which is converted by the regulator 62 from the AC voltage obtained by the sensing resistor $R_s$ and which is delivered from the regulator 62 to the controller 10 is higher than the tolerable voltage level $V_{ref}$. As soon as it is determined that the DC voltage exceeds the tolerable voltage level $V_{ref}$, the controller 10 generates the interruption control signal that halts the operation of the controller 10 immediately. In consequence, the controller 10 stops sending out the first and the second output signals, and both the first and the second filaments 201, 202 are prevented from producing electric arcs when broken because of age or defects. At the same time, the resonant capacitor $C_r$ is also kept from generating an extremely high resonant current which may otherwise result from abrupt oscillation caused by an electric arc at the broken filament and which may burn the related circuits and components of the electronic ballast or even ignite the plastic parts of the lamp fixture that are used to secure the two ends of the fluorescent light tube 20. Thus, the object of providing protection to the electronic ballast is achieved.

The circuit shown in FIG. 4 is only a preferred embodiment of the present invention, and implementation of the present invention is by no means limited thereto. The circuit design of the electronic ballast disclosed herein may be modified according to practical needs. Nonetheless, whatever such modifications may be, the present invention is directed specifically to a circuit structure applicable to an electronic ballast. A person skilled in the art of electronic ballast design may produce an electronic ballast which is based on the design concept of the present invention but different from the embodiment described above without departing from the scope of the present invention, provided that the electronic ballast is provided with a voltage sensor and a regulator, the voltage sensor being configured for sensing the AC voltage at a resonant capacitor, the regulator being configured for converting the AC voltage into a DC voltage and delivering the DC voltage to a controller, the controller being configured for generating an interruption control signal upon determining that the level of the DC voltage exceeds a preset tolerable voltage level, so as to stop the operation of the controller immediately and thereby prevent the electronic ballast from burning or causing fire accidents as may otherwise occur at the natural end of life or a premature end of life of a fluorescent light tube connected to the electronic ballast if an electric arc takes place at a broken filament of the fluorescent light tube, regardless of whether the breaking of the broken filament is the result of age or defects.

To ensure the feasibility of the electronic ballast of the present invention, the inventor designed the electronic ballast circuit in detail as shown in FIG. 5, which is based on the circuit block diagram of FIG. 4. More particularly, the voltage sensor 61 in FIG. 4 is implemented by the sensing resistor $R_s$ in FIG. 5 so as to sample the AC voltage at the resonant capacitor $C_r$. When the fluorescent light tube 20 ages, the light tube voltage tends to rise continuously; hence, the AC voltage sampled by the sensing resistor $R_s$ becomes higher and higher. On the other hand, the voltage doubler capacitor $C_{10}$, the rectifier diode $D_2$, the resistor $R_9$, the rectifier diode $D_4$, the resistor $R_{10}$, and the filter capacitor $C_{11}$ in FIG. 5 constitute the regulator 62 in FIG. 4. The two rectifier diodes $D_2$, $D_4$ are configured for performing full-wave rectification on the AC voltage sampled by the voltage sensor 61 (i.e., the sensing resistor $R_s$), wherein one of the rectifier diodes can be a Zener diode. The resistor-capacitor (RC) filter circuit ($R_9$, $R_{10}$, $C_{10}$, $C_{11}$) generates a DC voltage proportional to the AC voltage and delivers the DC voltage to an input end of the comparator 63 in the controller 10. If the comparator 63 in the controller 10 detects that the DC voltage at the filter capacitor $C_{11}$ in the regulator 62 exceeds the tolerable voltage level $V_{ref}$, the comparator 63 outputs an interruption control signal to stop the operation of the controller 10 instantly. Thus, the electronic ballast is prevented from being burned by electric arcs which may otherwise occur continuously at a broken one of the first and the second filaments 201, 202, and the risks of fire accidents associated with the electronic ballast are also eliminated.

Figure 6:
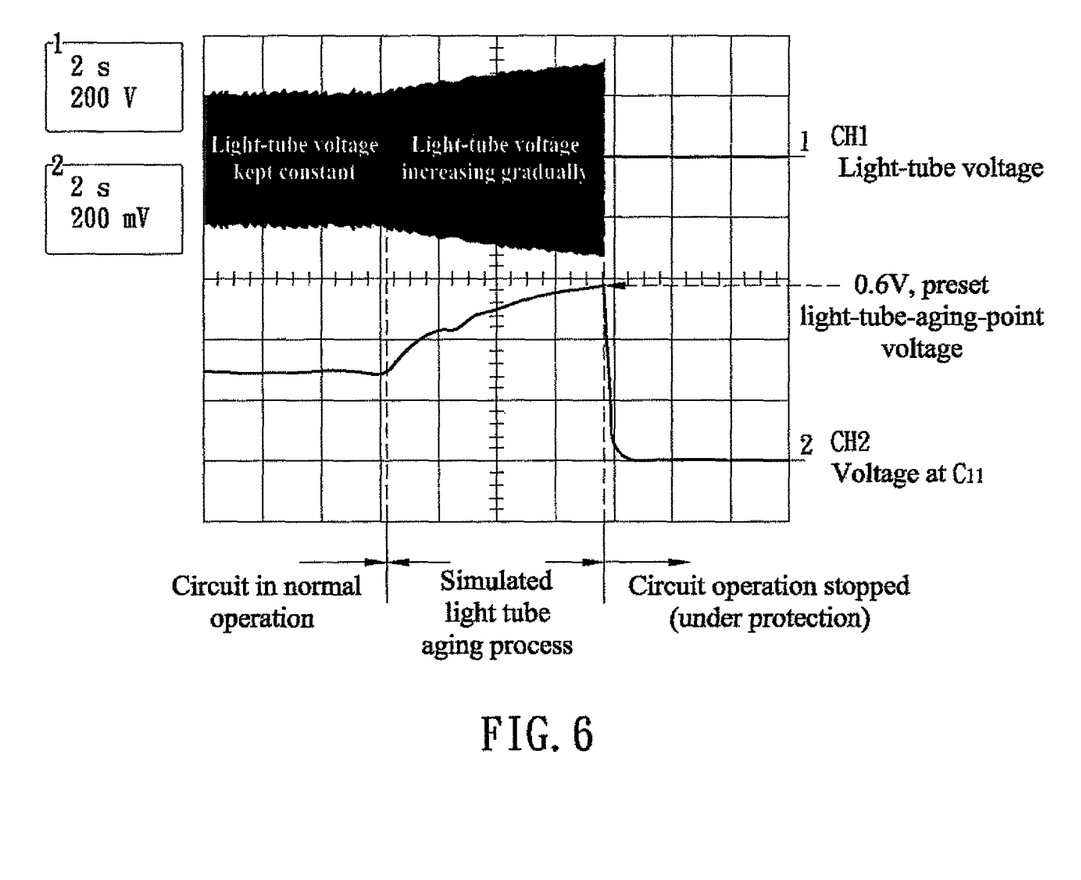
FIG. 6 is a plot showing test results of the circuit depicted in FIG. 5, as displayed on an oscilloscope.

The electronic ballast shown in FIG. 5 was tested using an oscilloscope in the follow way. The fluorescent light tube 20 was substituted by a variable resistor of a power stage, and the resistance of the variable resistor was gradually increased to simulate the aging of the fluorescent light tube. Referring to FIG. 6 for the test results displayed on the oscilloscope, the DC voltage at the filter capacitor $C_{11}$ in the regulator 62 (i.e., the waveform CH2) gradually increased with the light tube voltage (i.e., the waveform CH1) and finally exceeded the tolerable voltage level $V_{ref}$, which is 0.6V above or below the normal light tube voltage. No sooner had the tolerable voltage level $V_{ref}$ been exceeded than the self-protection mechanism of the electronic ballast was activated to stop the operation of the controller 10 immediately. Thus, oscillation between the resonant inductor $L_r$ and the resonant capacitor $C_r$ was brought to an instant end, and the electronic ballast was well protected and proved to be intact after the test.

The embodiments described above are provided by way of example only and may be modified as appropriate. The self-protection function of the disclosed electronic ballast can be achieved by other controllers, voltage sensors, or regulators as well.

What is claimed is:

1. An electronic ballast capable of self-protection at a natural or premature end of life of a fluorescent light tube, wherein the electronic ballast is connected in parallel to a first filament and a second filament provided respectively at two ends of the fluorescent light tube and comprises:
    a controller configured for generating at least a first output signal and a second output signal, wherein the first output signal and the second output signal are voltage signals having a same frequency but different phases;
    a first power switch and a second power switch, wherein the first power switch has a first end connected in series to a first end of the second power switch, has a second end connected to a positive electrode of a power supply, and receives the first output signal so as to be switched according to the first output signal, and the second power switch has a second end connected to a negative electrode of the power supply and receives the second output signal so as to be switched according to the second output signal;
    a direct-current (DC) blocking capacitor connected in series to a line connecting the first power switch and the second power switch;
    a resonant circuit comprising a resonant inductor and a resonant capacitor, wherein the resonant inductor is connected in series between the DC blocking capacitor and the first filament, and the resonant capacitor is connected in parallel between the first filament and the second filament, so as for the resonant circuit to oscillate according to switching of the first power switch and the second power switch and thereby cause the resonant capacitor to generate a voltage;
    a voltage sensor connected in series to the resonant capacitor and connected in parallel between the first filament and the second filament so as to sense an alternating-current (AC) voltage proportional to a voltage across the fluorescent light tube; and
    a regulator connected separately to the voltage sensor and the controller so as to receive the AC voltage from the voltage sensor, convert the AC voltage into a DC voltage, and deliver the DC voltage to the controller;
    wherein the controller, upon determining that the DC voltage exceeds a preset tolerable voltage level, generates an interruption control signal for immediately stopping operation of the controller.

2. The electronic ballast of claim 1, wherein the first power switch and the second power switch are power metal-oxide-semiconductor field-effect transistors, the first power switch having a gate for receiving the first output signal and a drain connected to the positive electrode of the power supply, the second power switch having a gate for receiving the second output signal, a drain connected to a source of the first power switch, and a source connected to the negative electrode of the power supply.

3. The electronic ballast of claim 2, wherein the voltage sensor is a sensing resistor.

4. The electronic ballast of claim 3, wherein the regulator comprises two rectifier diodes for performing full-wave rectification on the AC voltage sampled by the voltage sensor and a resistor-capacitor (RC) filter circuit for generating the DC voltage, which is proportional to the AC voltage, and delivering the DC voltage to an input end of a comparator in the controller.

5. The electronic ballast of claim 4, wherein one of the rectifier diodes is a Zener diode.

* * * * *